United States Patent [19]

Stark

[11] 4,062,712
[45] Dec. 13, 1977

[54] METHOD FOR MAKING A PACKING LAMINATE

[75] Inventor: Olof Sven Sören Stark, Rydsgard, Sweden

[73] Assignee: AB Ziristor, Lund, Sweden

[21] Appl. No.: 729,675

[22] Filed: Oct. 5, 1976

[30] Foreign Application Priority Data

Oct. 24, 1975 Sweden .............................. 7511919

[51] Int. Cl.² .................. B29D 27/00; B29F 3/00
[52] U.S. Cl. .................... 156/244; 156/259; 156/271; 156/500; 264/146; 264/159; 428/315
[58] Field of Search ............. 156/244, 500, 260, 259, 156/271, 510, 512, 517; 264/45.9, 46.2, 46.3, 150, 159, 160, 173, 209, 95, 146; 425/131.1, 133.1, 308; 428/315, 320, 322

[56] References Cited

U.S. PATENT DOCUMENTS

| | | | |
|---|---|---|---|
| 3,524,795 | 8/1970 | Peterson | 156/244 |
| 3,645,822 | 2/1972 | Widiger et al. | 156/244 |
| 3,758,354 | 9/1973 | Sakurai et al. | 156/244 |
| 3,758,370 | 9/1973 | Sakurai et al. | 156/244 |
| 3,822,161 | 7/1974 | Haase | 156/244 |

FOREIGN PATENT DOCUMENTS

| | | | |
|---|---|---|---|
| 7,627 | 1962 | Japan | 156/244 |

*Primary Examiner*—Caleb Weston
*Attorney, Agent, or Firm*—Pierce, Scheffler & Parker

[57] ABSTRACT

A packing laminate for use in the manufacture of disposable packages consists of a relatively thin central layer made from high-density polyethylene, two intermediate foam layers of polystyrene applied respectively to opposite faces of the central layer by means of a thermoplastic glue and two outer layers of a compact high-impact polystyrene applied respectively to the intermediate layers. The laminate is manufactured by joint extrusion of a flexible tube consisting of an inner layer of the foamed polystyrene and an outer layer of the compact high-impact polystyrene, this tube being thereafter split longitudinally into two halves to form two webs which are then joined respectively to opposite sides of the central layer of high density polyethylene following its extrusion.

3 Claims, 2 Drawing Figures

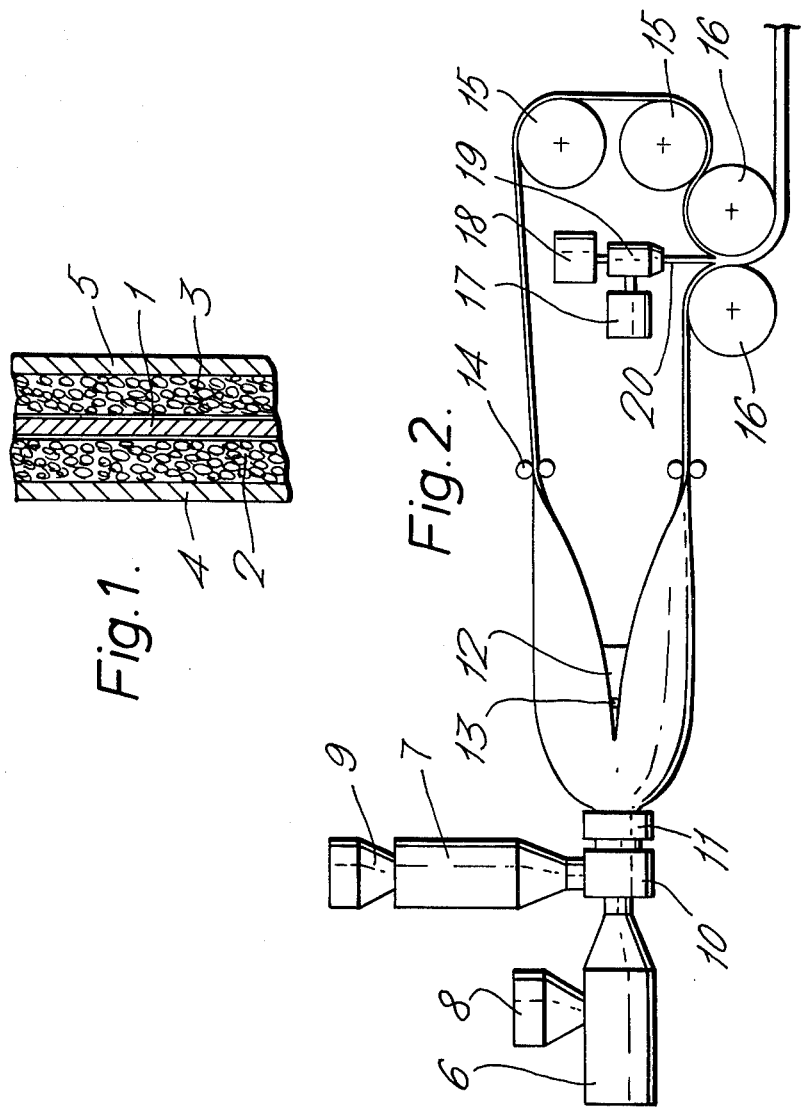

METHOD FOR MAKING A PACKING LAMINATE

The present invention relates to a symmetrically constructed packing laminate comprising layers of compact as well as of porous plastics together with a method for the manufacture of such a packing laminate.

In packaging technique laminated material is frequently used for the manufacture of disposable packages for e.g. liquid foodstuffs. A typical such material comprises a centrally situated carrier layer of relatively thick paper, which layer is laminated on either side with thin, sealing layers of any suitable plastic material. The paper serves here to impart to the material the required stiffness and to make possible the formation and folding of packing containers, whilst the surrounding plastic layers make the material impervious to liquids and provide a smart outside surface for the package. In the manufacture of packing containers from the laminate described it is naturally impossible to avoid cut edges, where the central paper layer is exposed and unprotected by the two plastic layers. This is a disadvantage, since the paper has a strong tendency to absorb moisture, which gives rise to diminished strength and stiffness and to a less attractive appearance.

This disadvantage, together with other disadvantages of an economic nature and associated with manufacturing problems, have led to a substitute material, wherein the paper layer is replaced by a layer of porous or foamed plastic material. A typical such material comprises a centrally situated carrier layer of foamed polystyrene, which layer is covered on both sides with a layer of homogeneous polystyrene. The central layer of foamed or porous plastic material naturally has not the same characteristics of strength and stiffness as the central carrier layer of paper used earlier, but the required material stiffness is achieved instead, in that the central foamed plastic layer is given a relatively great thickness, as a result of which the two homogeneous plastic layers will be at such a mutual distance from one another that a "joist effect" is produced, which imparts adequate stiffness to the material. When optimum stiffness is desired, the two outer material layers must be manufactured from a plastic material which has small extensibility. However, this makes the layers brittle and causes them to crack easily when the material is strongly folded. A packing container made of such a material may thus have a certain tendency to leak, when it is subjected to impacts which deform the material. It has been attempted to overcome this disadvantage, inter alia, by making one of the two outer layers of a softer and more extensible plastics, but by this the overall rigidity of the laminate is diminished instead. It has been necessary therefore up to now to make an accurate assessment of the characteristics of the different materials and to adapt the type of laminate to the type and size of the packing container which is to be manufactured.

It is an object of the present invention to provide a packing laminate which is not subject to the abovementioned disadvantages.

It is a further object of the present invention to provide a packing laminate which combines both the desired characteristics i.e. is both rigid and tough.

These and other objects have been achieved in accordance with the invention in that a packing laminate of the type described at the start is given the characteristic, that it comprises a relatively thin central layer of compact plastic material of great extensibility, two layers situated on either side of the same of porous plastic material, which layers are appreciably thicker than the central layer, and two outer layers of compact plastic material of great stiffness.

It is a further object of the present invention to provide a method for the manufacture of the packing laminate, which method is simple and can be executed in one sequence.

This object has been achieved in accordance with the invention in that a packing laminate in accordance with claim 1 has been given the characteristic, that a flexible tube of laminated material comprising an inner layer of porous plastic material and an outer layer of compact plastic material of great stiffness is manufactured by joint extrusion, that the tube by means of longitudinal cuts is divided into two halves which are transformed to parallel webs, that the porous layer of at least one web is covered with a layer of a plastic material of great extensibility, whereupon the webs are combined and rolled together to form the symmetrical laminate.

A preferred embodiment of the packing laminate as well as of the method for the manufacture of the same will be described in more detail in the following with reference to the enclosed schematic drawing.

FIG. 1 shows on an enlarged scale a cross-section through a piece of a packing laminate in accordance with the invention.

FIG. 2 shows in perspective view an arrangement for the manufacture of the packing laminate in accordance with the invention.

As can be seen from FIG. 1, the packing laminate in accordance with the invention comprises a relatively thin central layer 1 of compact plastic material, two appreciably thicker layers 2, 3 which are situated on either side of the central layer 1 and are constituted of porous or foamed plastic material, and two relatively thin outer layers 4, 5 of compact or homogeneous plastic material. It is essential for the invention that the different layers should be manufactured from plastic material with certain definite characteristics. The central layer 1 thus has to be manufactured from a plastic material of great extensibility. The material shall have an ultimate elongation exceeding 100% and preferably between 200 and 800%.

The two porous layers 2, 3 shall consist of a foamed plastic material and have a density of 0.03–0.2 g/cm$^3$. A preferred density value is 0.04–0.07 g/cm$^3$.

The two outer, compact plastic layers 4, 5 shall consist of plastic material of great stiffness. The material shall have a modulus of elasticity of between 10,000 and 50,000, preferably though approx. 30,000.

The thickness of the layers included is also of great importance for the function of the material. The central layer 1 and the two outer layers 4, 5 should all have a thickness of 0.01–0.2 mm, and the two porous layers 2, 3 have appropriately a thickness of between 0.2 and 2 mm. The thickness of the layers included is chosen as a function of the stiffness and strength characteristics required in the finished laminate, and of the required thickness of the same. If the laminate is to have the desired optimum characteristics, the thicknesses must be chosen so that each one of the porous plastic layers has a thickness which is substantially 10 times greater than the thickness of each of the compact layers.

In the preferred embodiment of the packing laminate in accordance with the invention described the central layer 1 consists of high-density (HD) polyethylene, the two foam layers 2, 3 of polystyrene and the two outer, compact layers 4, 5 of high impact (HI) polystyrene. To make possible a good lamination between the polyethylene layer 1 and the two layers 2, 3 of foamed polystyrene the laminate comprises also two layers of thermoplastic glue, preferably ethylene vinyl acetate (EVA) situated on either side of the central polyethylene layer 1. The layers included in the preferred laminate have moreover the thickness ratio of 10:1 mentioned, that is to say the two layers of polystyrene foam are approx. 10 times thicker than the layers of high-impact polystyrene and high-density polyethylene.

The material well achieves the proposed object and may be characterized as both stiff and tough. The stiffness is achieved, as in the known materials described at the start, in that the two outer compact layers made of high-impact polystyrene are joined to one another via intermediate layers and are situated at such a mutual distance that the laminate acts as a joist. The toughness of the material is achieved with the help of the central layer of a material which in itself is extensible and tough (HD-polyethylene) and which via the flexible and deformable polystyrene foam layers is joined to the outer layers. Owing to the relatively great distance between the central layer and the outer layers on the one hand, and owing to the compensating effect of the foamed plastic layer on the other hand, the central layer and the outer layers will to a certain degree remain mutually movable without the connection between them being broken. As a result, stresses will be transmitted only to a limited extent between the outer layers and the central layer, which gives the material flexibility and toughness and gives it the capacity of enduring stresses. The material does not lose its sealing function, even if the outer, less extensible layers are cracked.

In the following, the method of manufacturing the packing laminate in accordance with the invention will be described in detail with reference to FIG. 2 which shows an arrangement for the manufacture of the laminate. The arrangement consists of two extrusion devices or extruders 6, 7 which are of a conventional type and comprise each a screw compressor driven by means of an electric motor. The extruders are provided with hoppers 8, 9 for granulated plastics of the required qualities. The front ends of the extruders 6, 7 are joined via a combining element 10 to a die 11. The combining element 10 and the die 11 are of the known type used for combined extrusion and they are designed so that on operation of the extruders a tube of a combined material, comprising an inner layer of plastics originating from the one extruder 6 and an outer layer of plastics originating from the other extruder 7, is obtained.

At some distance in front of the die 11 a spool-shaped moulding device 12 is provided, which on its periphery has two opposite cutting elements 13 consisting of knives with edges pointing towards the die. The arrangement comprises moreover a number of guiding and forming rolls 14, 15, as well as two laminating rolls 16 which cooperate with one another. The laminating rolls 16 are adjustable in the direction towards and away from one another, so that the play between them can be varied. A motor (not shown) is arranged so as to drive the two laminating rolls 16 at a common speed but in opposite directions. Above the laminating rolls 16 are two further extruders 17, 18 which are both coupled to one die 19 which is designed so as to allow the extrusion of a web-shaped plastic film consisting of several layers.

The guiding and forming rolls are supported freely rotatable and their number, location and size may vary.

When the packing laminate in accordance with the invention is to be manufactured with the help of the arrangement described, the hopper 8 of the extruder 6 is filled with polystyrene granulate (with reference here to the preferred embodiment of packing laminate) and the hopper 9 of the other extruder 7 with high-impact polystyrene. After starting the extruders 6, 7 and the consequent melting and compression of the two types of plastics, the polystyrene present in the extruder 6 is mixed under pressure with a gas (preferably freon gas), which owing to the high pressure dissolves in the molten polystyrene. On continued operation, the molten high-impact polystyrene and the molten polystyrene containing gas are pressed via separate ducts to the combining element 10, whereupon they are extruded jointly through the die 11 to form a combined flexible tube. On issuing from the die 11, a number of small bubbles will be formed in the polystyrene pressed from the extruder 6, because the gas dissolved in the plastic melt, when the plastic mass emerges from the die, will be liberated owing to the pressure drop, and will expand. Hence the polystyrene, on being extruded from the annular die, will "foam" and form a porous plastic tube which is surrounded by and joined to the high-impact polystyrene extruded at the same time, which is compact and covers the outside of the polystyrene foam tube formed as a thin film.

The flexible tube formed is moulded with the help of the moulding device 12 situated in front of the die 11 and is then divided by means of the cutting element 13 arranged on the moulding device into two halves which are guided separately to the two groups of guiding and forming rolls 14 which transform the two halves of the flexible tube to substantially plane webs of equal width. The webs are passed via the rolls 15 to the gap between the two driven, laminating rolls 16. Directly before the two webs are joined and rolled together by means of the laminating rolls 16, a plane web 20 which comprises the central layer of HD-polyethylene, coated on both sides with EVA, extruded with the help of the extruding assembly 17–19 arranged above the rolls, is inserted between them. The newly extruded combined web 20 is passed down, whilst it is still warm, between the two original webs in the gap between the laminating rolls 16, where the webs are rolled together to form the packing laminate which subsequently is moved on to be wound up, cut or be processed further in some other manner.

The method of manufacture described can be adapted to the type of packing laminate which has to be manufactured under given circumstances. Thus it is possible, for example, to provide the extruding assembly 6–11 with a further extruding unit, if for the material layers 2, 3 and for the material layers 4, 5 such materials are selected which cannot directly be joined to one another. The additional extruding unit can then apply an intermediate layer of thermoplastic glue. The combining element 10 and the die 11 must of course be modified in a corresponding manner. Similarly it is possible to simplify the extruder 17–19, if the choice of material is such, that the layer of thermoplastic glue present on both sides of the central layer 1 can be eliminated.

I claim:

1. A method for manufacturing a laminate having a first central layer of an extensible, high density, homogeneous thermoplastic material, second layers of foamed plastic material on opposed sides of the first layer and opposed third layers of high impact, homogeneous, thermoplastic material disposed on the outer sides of the second layers, said method comprising extruding a tube composed of a layer of a foamed plastic material, and a layer of a high impact, homogeneous thermoplastic material on the outside thereof, cutting said tube longitudinally thereof at substantially opposite locations, flattening each portion of the cut tube to form a pair of opposed flat webs, the foamed plastic material of one web facing the foamed plastic material on the other web, passing said webs between a pair of pressing rolls, extruding into the nip between the two webs as they pass between the pressing rolls, a layer of an extensible, high density, homogeneous, thermoplastic material whereby the layer of extensible, high density, homogeneous thermoplastic material is adhered to the foamed plastic layers of the webs to form the laminate.

2. A method as claimed in claim 1 and further comprising the step of extruding layers of a thermoplastic adhesive material on each side of the layer of extruded extensible, high density, homogeneous, thermoplastic material as the two webs are passed between the pressing rolls to enhance the adhesion of the webs to the layer of extensible, high density, homogeneous, thermoplastic material.

3. A method as claimed in claim 2 wherein the layers of the extruded adhesive material and the layer of extruded extensible, high density, homogeneous, thermoplastic material are extruded together onto the layer of foamed plastic material of at least one of the webs immediately before being passed between the pressing rolls.

* * * * *